United States Patent [19]
Smith

[11] Patent Number: 5,921,386
[45] Date of Patent: Jul. 13, 1999

[54] PACKAGE FOR A COMPACT DISC

[75] Inventor: Gregory M. Smith, Carrollton, Ga.

[73] Assignee: Printed Specialities, Ltd., Carollton, Ga.

[21] Appl. No.: 08/855,819

[22] Filed: May 12, 1997

[51] Int. Cl.$^6$ ................................. B65D 85/57
[52] U.S. Cl. ................. 206/308.1; 206/523; 206/312
[58] Field of Search ............................ 206/308.1, 312, 206/313, 523

[56] References Cited

U.S. PATENT DOCUMENTS

| | | | |
|---|---|---|---|
| D. 226,146 | 1/1973 | Price ............................................. D87/1 |
| 2,430,609 | 11/1947 | Guyer . |
| 3,347,445 | 10/1967 | Wood . |
| 3,583,729 | 6/1971 | DeGroot ........................................ 281/31 |
| 3,604,556 | 9/1971 | Schwartz ......................................... 206/1 |
| 3,641,684 | 2/1972 | Paige .............................................. 35/8 |
| 3,642,125 | 2/1972 | Johnson ........................................ 206/47 |
| 3,682,297 | 8/1972 | Austin et al. .......................... 206/45.14 |
| 3,708,061 | 1/1973 | Weingarden et al. ................. 206/45.34 |
| 3,785,478 | 1/1974 | Drori ........................................... 206/312 |
| 3,896,929 | 7/1975 | Mills ........................................... 206/387 |
| 4,235,334 | 11/1980 | Ahn ............................................ 206/387 |
| 4,341,307 | 7/1982 | Shyers ........................................ 206/387 |
| 4,381,058 | 4/1983 | Chaussadas et al. .................... 206/497 |
| 4,433,780 | 2/1984 | Elllis ........................................... 206/232 |
| 4,709,812 | 12/1987 | Kosterka .................................... 206/310 |
| 4,805,769 | 2/1989 | Soltis et al. ................................ 206/309 |
| 5,048,681 | 9/1991 | Henkel ....................................... 206/312 |
| 5,088,599 | 2/1992 | Mahler ....................................... 206/313 |
| 5,090,561 | 2/1992 | Spector ...................................... 206/313 |
| 5,127,526 | 7/1992 | Vigue ......................................... 206/587 |
| 5,186,327 | 2/1993 | McCafferty et al. ...................... 206/313 |
| 5,188,229 | 2/1993 | Bernstein .................................. 206/312 |
| 5,199,743 | 4/1993 | Rosinski, III .............................. 281/45 |
| 5,205,405 | 4/1993 | O'Brien et al. ........................... 206/310 |
| 5,236,081 | 8/1993 | Fitzsimmons et al. ..................... 206/44 |
| 5,284,242 | 2/1994 | Roth et al. ................................. 206/310 |
| 5,285,893 | 2/1994 | Misterka et al. .......................... 206/310 |
| 5,310,053 | 5/1994 | Lowry et al. .............................. 206/310 |
| 5,332,089 | 7/1994 | Tillett et al. ............................... 206/310 |
| 5,366,074 | 11/1994 | O'Brien et al. ........................... 206/312 |
| 5,377,825 | 1/1995 | Sykes et al. ............................... 206/232 |
| 5,377,827 | 1/1995 | Roth et al. ................................. 206/310 |
| 5,379,890 | 1/1995 | Mahler ....................................... 206/310 |
| 5,381,894 | 1/1995 | Misterka et al. .......................... 206/310 |
| 5,450,953 | 9/1995 | Reisman .................................... 206/310 |
| 5,460,265 | 10/1995 | Kiolbasa ................................. 206/308.1 |
| 5,462,159 | 10/1995 | Roth et al. ................................. 206/310 |
| 5,469,965 | 11/1995 | Stearns ...................................... 206/523 |
| 5,511,659 | 4/1996 | Bosworth ............................... 206/308.1 |
| 5,551,559 | 9/1996 | Roth et al. .............................. 206/308.1 |
| 5,570,781 | 11/1996 | Bond et al. ............................ 206/308.1 |
| 5,575,387 | 11/1996 | Gelardi .................................. 206/308.1 |
| 5,611,426 | 3/1997 | Warfield ................................. 206/308.1 |
| 5,816,394 | 10/1998 | O'Brien et al. ........................ 206/308.1 |

*Primary Examiner*—Paul T. Sewell
*Assistant Examiner*—Jila Mohandesi
*Attorney, Agent, or Firm*—Needle & Rosenberg, P.C.

[57] ABSTRACT

The disadvantages of the prior art are overcome by the present invention which in one aspect is an apparatus for packaging a compact disc, comprising a paperboard shell and holding member. The paperboard shell includes a top panel that defines a circular opening passing therethrough having a diameter at least equal to the diameter of a compact disc. The paperboard shell also includes a first side panel, a bottom panel that is disposed opposite the top panel, and a second side panel that is disposed opposite the second side panel. A glue tab extends from the first top panel and is affixed to the second side panel. The top panel, the first side panel, the bottom panel, and the second side panel with the glue tab affixed thereto define a cavity therein. The holding member is disposed within the cavity of the paperboard shell and has a top surface defining a circular recess. The circular recess has a diameter approximately equal to the diameter of a compact disc and is in alignment with the circular opening so as to be able to receive a compact disc therein. The holding member is made from a resilient material that allows insertion and removal of a compact disc to and from the recess and that also provides holding support for a compact disc when placed within the recess.

16 Claims, 3 Drawing Sheets

PACKAGE FOR A COMPACT DISC

BACKGROUND OF THE INVENTION

1. Field of the Invention

The present invention relates to packaging and, more specifically, to a package for compact discs.

2. Description of the Prior Art

With the advent of digital video disc (DVD) technology, there is a need for mailing and storing video discs, and other compact discs, in a holder that is inexpensive, sturdy and attractive. Plastic disc holders have long been known to the art. However, plastic has the disadvantages of being a poor medium for printing high resolution color graphics thereon and being relatively expensive. Furthermore, many existing plastic compact disc holders have the disadvantage of requiring manual fulfilment (the placing of a disc in a package), increasing the cost of mass mailing of discs.

Nowhere in the prior art is there an inexpensive compact disc package that can be fulfilled by machine and that is both sturdy and allows for the printing of high resolution graphics thereon.

SUMMARY OF THE INVENTION

The disadvantages of the prior art are overcome by the present invention which in one aspect is an apparatus for packaging a compact disc comprising a paperboard shell and a holding member. The paperboard shell may be a narrow box with a top panel sufficiently large to have an opening for a compact disc. The box has a resilient material placed inside, forming the holding member, which has a cut-out recess for holding the compact disc therein. A flap connected to an edge of the top panel provides a protective covering of the disc.

More specifically, the paperboard shell includes a top panel terminating in a first side hinge and a second side hinge. The top panel defines a circular opening passing therethrough that has a diameter at least equal to the diameter of a compact disc. A first side panel extends from the first side hinge and terminates in a third side hinge. A bottom panel extends from the third side hinge and is disposed opposite the top panel. The bottom panel terminates in a fourth side hinge opposite the third side hinge. A second side panel extends from the fourth side hinge and is disposed opposite the second side panel. A glue tab extends from the first side hinge and is affixed to the second side panel. The top panel, the first side panel, the bottom panel, and the second side panel with the glue tab affixed thereto define a cavity therein. The holding member is disposed within the cavity of the paperboard shell and has a top surface defining a circular recess. The circular recess has a diameter approximately equal to the diameter of a compact disc and is in alignment with the circular opening so as to be able to receive a compact disc therein. The holding member is made from a resilient material that allows insertion and removal of a compact disc to and from the recess and that also provides holding support for a compact disc when placed within the recess.

In another aspect, the invention is a package for a compact disk that includes a shell having a plurality of panels defining a cavity therebetween. A panel of the plurality of panels defines an opening large enough for a compact disc to pass therethrough. A foam holding member disposed within the cavity defines a recess in alignment with the opening. The recess has a diameter sufficient to receive a compact disc therein.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
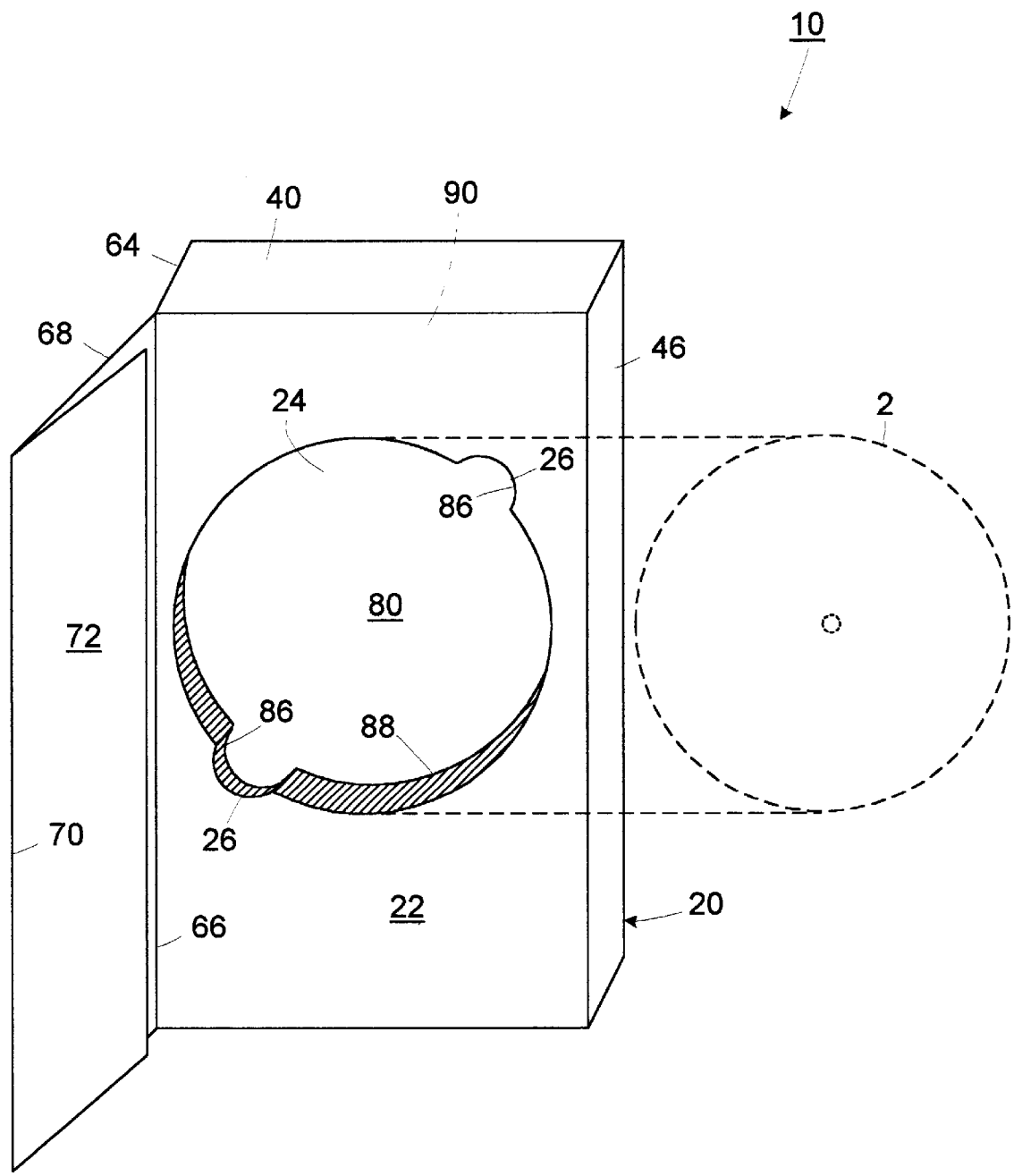
FIG. 1 is a top front perspective view of a preferred embodiment of the present invention.
Figure 2:
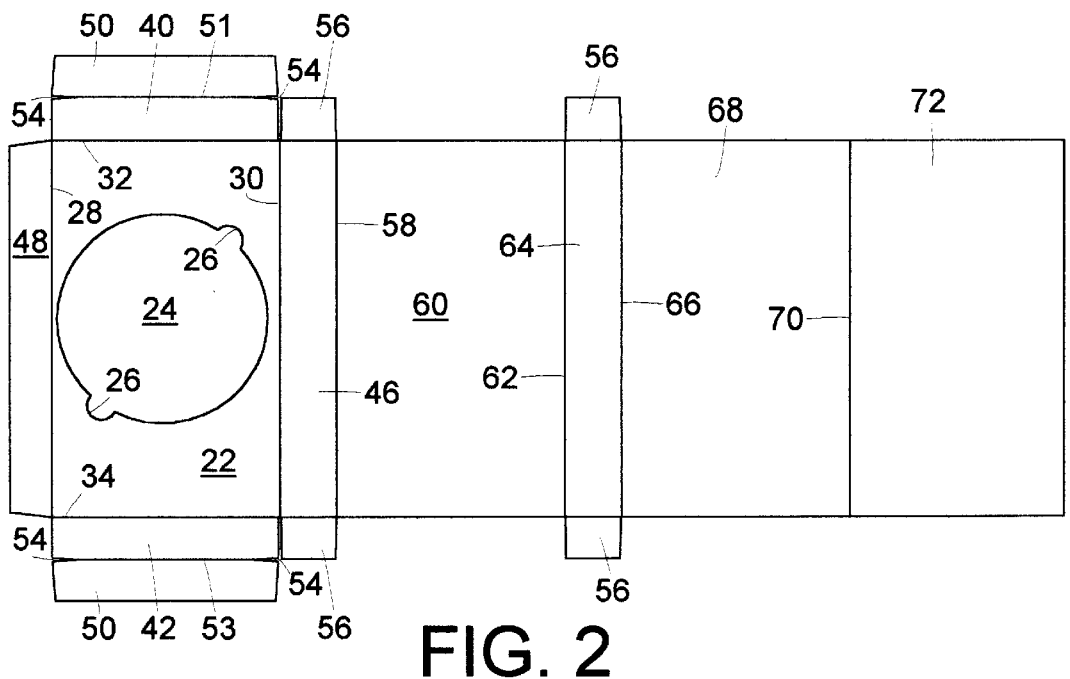
FIG. 2 is a schematic diagram of a paperboard blank employed in the embodiment of FIG. 1.
Figure 3:
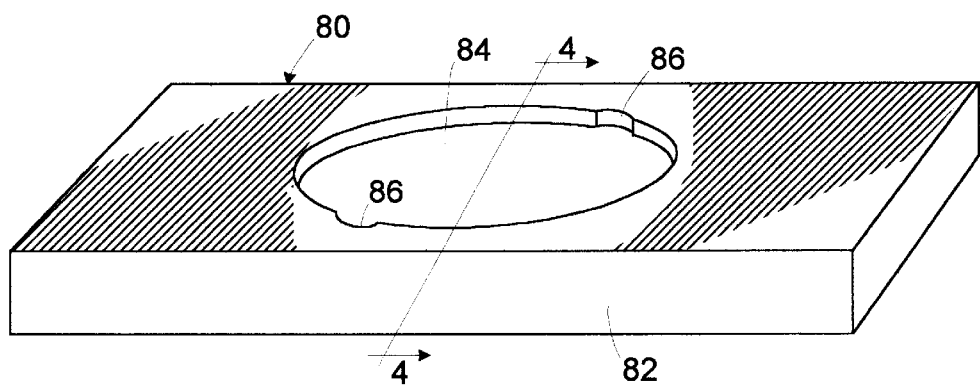
FIG. 3 is a top front perspective view of a holding member employed in the embodiment of FIG. 1.
Figure 4:
FIG. 4 is a cross-sectional view of a the holding member of FIG. 3 taken along line 4—4.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on."

As shown in FIGS. 1–4, the present invention is a package 10 for a compact disc 2, comprising a paperboard shell 20 and a holding member 80. The paperboard shell 20 is die cut from paperboard and includes a top panel 22 terminating in a first side hinge 28 and a second side hinge 30. The side hinges 28, 30 could be made in the paperboard by scoring the paperboard, as is commonly done in making paperboard containers. The top panel 22 defines a circular opening 24 passing therethrough that has a diameter at least equal to the diameter of a compact disc 2. The paperboard shell 20 also has a first side panel 46 extending from the second side hinge 30 and terminating in a third side hinge 58. A bottom panel 60 extends from the third side hinge 58 and is disposed opposite the top panel 22. The bottom panel 60 terminates in a fourth side hinge 62 opposite the third side hinge 58. A second side panel 64 extends from the fourth side hinge 62 and is disposed opposite the first side panel 46. A glue tab 48 extends from the first side hinge 28 and is affixed to the second side panel 64 using glue, tape, or other conventional means for affixing paperboard. Thus, the top panel 22, the first side panel 46, the bottom panel 60, and the second side panel 64, with the glue tab 48 affixed thereto define a cavity 90 therein.

The holding member 80 is disposed within the cavity 90 of the paperboard shell 20 and has a top surface 82 defining a circular recess 84 having a diameter approximately equal to the diameter of a compact disc 2. The circular recess 84 is in alignment with the circular opening 24 so as to be able to receive a compact disc 2 therein. The holding member comprises a resilient material that allows insertion and removal of a compact disc to and from the recess 84 and that also provides holding support for a compact disc 2 when placed within the recess 84.

Figure 5:
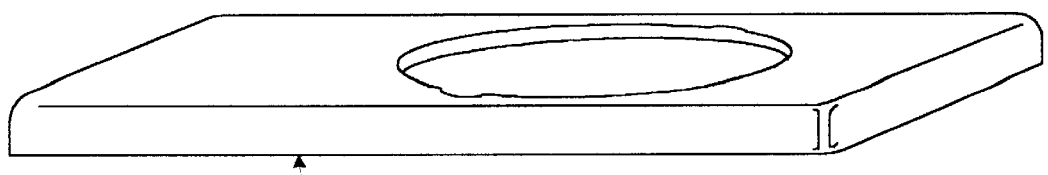
FIG. 5 is a top front perspective view of a thermoformed embodiment of a holding member.

The holding member 80 could be made from a foam such as foam rubber, or a styrene foam (such as STYROFOAM®). The holding member 80 could be die cut or injection molded, depending on the type of foam used. As shown in FIG. 5, an alternate embodiment of the holding member 180 also could be made from a sheet of thermoformed plastic. This could be made by vacuum-forming a heated sheet of plastic over a mold of the holding member 180. Returning to FIGS. 1–4, the holding member 80 could also comprise corrugated cardboard. If corrugated cardboard is used, it should be coated with a material, such as plastic, that would not abrade the compact disc 2.

The top panel 22 defines at least one thumb notch 26 adjacent the circular opening 24 to facilitate removal of a compact disc 2 from the circular recess 84. Similarly, the holding member 80 defines at least one thumb notch recess 86 in alignment with the thumb notch 26 defined by the top panel 22.

The top panel 22 also terminates at a first end hinge 32 and an opposite second end hinge 34. A first end panel 40 extends from the first end hinge 32 and terminates in a first end tab hinge 51, with a first end tab 50 extending from the first end tab hinge 51. A second end panel 42 extends from the second end hinge 34 and terminates in a second end tab hinge 53. A second end tab 52 extends from the second end tab hinge 53. The first end panel 40 is foldable at the first end hinge 32 and the second end panel 42 is foldable at the second end hinge 34 so that the first end panel 40 and the second end panel 42 are disposed opposite an parallel to each other. Similarly, the first end tab 50 is foldable at the first end tab hinge 51 and the second end tab 52 is foldable at the second end tab hinge 53 so that the first end tab 50 and the second end tab 52 are disposed adjacent the bottom end panel 60.

A plurality of side tabs 56 extend from side panels 46, 64 and the first end tab hinge 51 and the second end tab hinge 53 each define at least one locking slit 54 for engaging a side tab 56 thereby securing the first end panel 40 and the second end panel 42 in the closed position.

A cover panel 68 extends from the fifth side hinge 66 and is foldable so as to cover a portion of the top panel 22. The cover panel 68 terminates in a sixth side hinge 70 from which extends a fold over panel 72, which is secured to the cover panel 68 so as to add rigidity to the cover panel 68.

Figure 6:
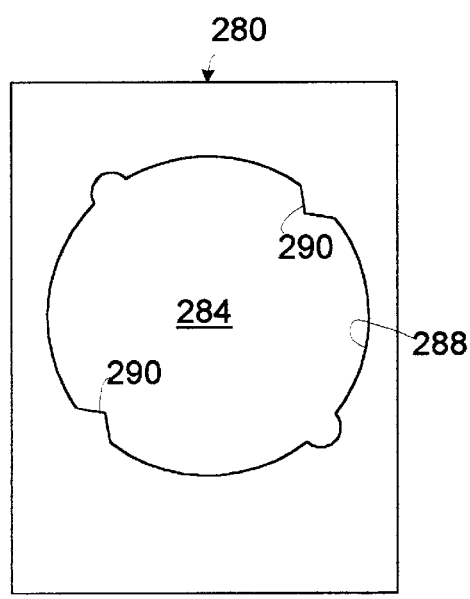
FIG. 6 is a top plan view of an embodiment of a holding member.

As shown in FIG. 6, in one embodiment, the circular recess 284 defined by the holding member 280 has a peripheral edge 288 from which extends at least one flexible detente 290. The detente 290 has sufficient length so as to provide additional holding support for a compact disc placed within the recess 284. This embodiment works best when the holding member 280 comprises materials like styrene foam.

Figure 7:
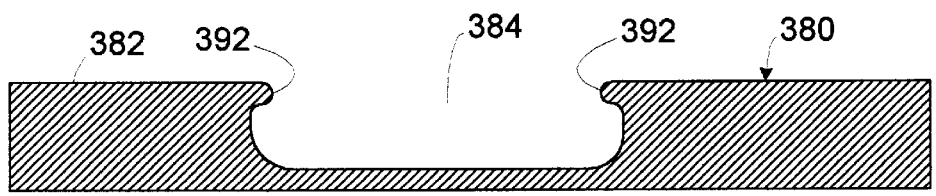
FIG. 7 is a cross-sectional view of an embodiment of a holding member.

As shown in FIG. 7, in an embodiment, which would work best when made from foam rubber, the circular recess 384 defined by the holding member 380 comprises a flexible lip 392 disposed adjacent the top surface 382 of the holding member 380. The lip 392 has a diameter less than the diameter of a compact disc to facilitate holding of a compact disc within the recess 384.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A package for a compact disc, comprising:
   a. a shell comprising:
      i. a top panel terminating in a first side hinge and a second side hinge, the top panel defining a circular opening passing therethrough, the circular opening having a diameter at least equal to the diameter of a compact disc;
      ii. a first side panel, extending from the second side hinge and terminating in a third side hinge;
      iii. a bottom panel, extending from the third side hinge and disposed opposite the top panel, the bottom panel terminating in a fourth side hinge opposite the third side hinge;
      iv. a second side panel extending from the fourth side hinge and disposed opposite the first side panel; and
      v. a glue tab extending from the first side hinge and affixed to the second side panel,
   so that the top panel, the first side panel, the bottom panel, and the second side panel with the glue tab affixed thereto define a cavity therein; and
   b. a holding member disposed within the cavity of the shell and having a top surface defining a circular recess, the circular recess having a diameter approximately equal to the diameter of a compact disc, the circular recess being in alignment with the circular opening so as to be able to receive a compact disc therein, the holding member comprising a resilient material that allows insertion and removal of a compact disc to and from the recess and that also provides holding support for a compact disc when placed within the recess.

2. The package of claim 1, wherein the shell comprises paperboard.

3. The package of claim 1, wherein the glue tab is affixed to the second side panel with glue.

4. The package of claim 1, wherein the top panel defines at least one thumb notch adjacent the circular opening to facilitate removal of a compact disc from the circular recess.

5. The package of claim 4, wherein the holding member defines at least one thumb notch recess in alignment with the thumb notch defined by the top panel.

6. The package of claim 1, wherein the top panel also terminates at a first end hinge and an opposite second end hinge, the paperboard shell further comprising:
   a. a first end panel extending from the first end hinge and terminating in a first end tab hinge;
   b. a first end tab extending from the first end tab hinge;
   c. a second end panel extending from the second end hinge and terminating in a second end tab hinge; and
   d. a second end tab extending from the second end tab hinge, the first end panel being foldable at the first end hinge and the second end panel being foldable at the second end hinge so that the first end panel and the second end panel are disposed opposite an parallel to each other, the first end tab being foldable at the first end tab hinge and the second end tab being foldable at the second end tab hinge so that the first end tab and the second end tab are disposed adjacent the bottom end panel.

7. The package of claim 6, further comprising
   a. a first side tab extending from the first side panel;
   b. a second side tab extending from the first side panel opposite the first side tab;
   c. a third side tab extending from the second side panel; and d. a fourth side tab extending from the second side panel opposite the first side tab, the first end tab hinge and the second end tab hinge each defining at least one locking slit for engaging a side tab, thereby securing the first end panel and the second end panel.

8. The package of claim 1, wherein the second side panel terminates in a fifth side hinge and further comprising a cover panel extending from the fifth side hinge and being foldable so as to cover a portion of the top panel.

9. The package of claim 8, wherein the cover panel terminates in a sixth side hinge and further comprising a fold over panel extending from the sixth side hinge, the fold over panel folded secured to the cover panel to add rigidity to the cover panel.

10. The package of claim 1, wherein the holding member comprises foam.

11. The package of claim 10, wherein the foam comprises foam rubber.

12. The package of claim 10, wherein the foam comprises styrene foam.

13. The package of claim 1, wherein the holding member comprises thermoformed plastic.

14. The package of claim 1, wherein the holding member comprises corrugated cardboard.

15. The package of claim 1, wherein circular recess defined by the holding member has a peripheral edge, further comprising at least one flexible detente extending from the peripheral edge having sufficient length so as to provide holding support for a compact disc placed within the recess.

16. The package of claim 1, wherein the circular recess defined by the holding member comprises a flexible lip disposed adjacent the top surface having a diameter less than the diameter of a compact disc.

* * * * *